M. B. GOMEZ.
VEHICLE TIRE.
APPLICATION FILED MAY 11, 1918.

1,294,084.

Patented Feb. 11, 1919.

Inventor:-
Miguel Barrios Gomez
By:- B. Singer,
Atty.

UNITED STATES PATENT OFFICE.

MIGUEL BARRIOS GOMEZ, OF MEXICO, MEXICO.

VEHICLE-TIRE.

1,294,084.          Specification of Letters Patent.     Patented Feb. 11, 1919.

Application filed May 11, 1918. Serial No. 233,874.

*To all whom it may concern:*

Be it known that I, MIGUEL BARRIOS GOMEZ, a citizen of the Republic of Mexico, and a resident of Mexico city, Mexico, have invented a certain new and useful Improvement in Vehicle-Tires, of which the following is a specification.

This invention relates to vehicles tires, and more particularly, to a substitution of the inflatable inner tubes and of the solid tires.

Various attempts have been made to provide a solid vehicle tire which possesses the characteristics of resiliency, strength, simplicity, cheapness, lightness and durability, necessary for general use and for taking the place of the pneumatic tires. These attempts have, however, been unsuccessful, excepting for heavy, freight-carrying vehicles, in which the resiliency of the tires is a secondary consideration. In vehicle tires as now constructed, with an inflatable inner tube, there exists always the danger that objects will penetrate the casing and puncture the inner tube, causing the high pressure to blow a hole in the tube, and frequently rip open the casing. Moreover, rim-cutting of the casing, pinching of the inner tube, flat tires and other accidents will shorten considerably the life of pneumatic tires, besides occasioning heavy expenses for repairs.

Some of the objects of this invention are to provide a tire in which the inflatable inner tube will be substituted by a layer or filler of triturated, agglutinated cork, in such a manner as not to impair the necessary resiliency of the tire.

Further objects will appear from the detailed description taken in connection with the accompanying drawing, in which.

Figure 1:
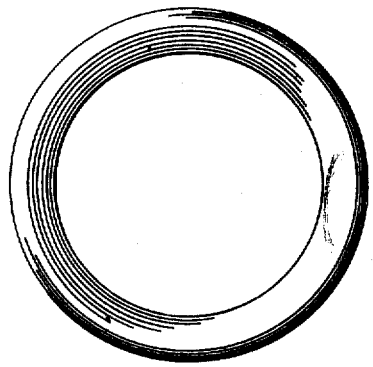
Figure 1 is a side elevation of the tire constructed according to my invention.
Figure 2:
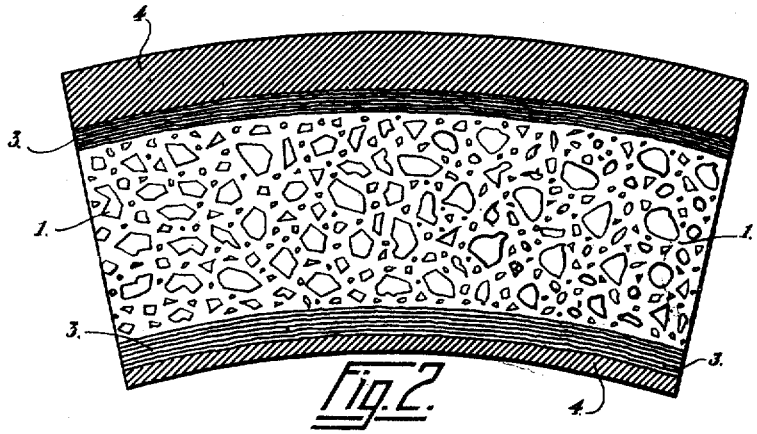
Fig. 2 is a longitudinal section through a section of a tire embodying this invention, showing the position of the cork filling.
Figure 3:
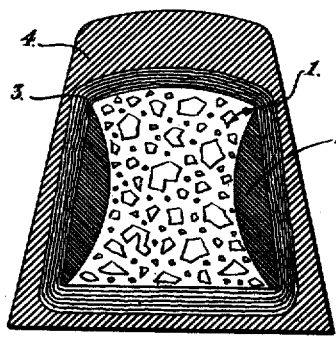
Fig. 3 is a cross section through the same tire.

In accordance with this invention, the tire is constructed of an elastic material, such as rubber, which has combined therewith a layer or filler of triturated, agglutinated cork, which extends circumferentially around the center of the tire, filling the space occupied in pneumatic tires by the inflatable inner tube. In order to increase the necessary cohesion of the cork, I provide layers of reinforcing material, such as tire fabric, which extend transversely around the cork filling; however, these layers are not absolutely necessary, as the body of triturated, agglutinated cork will form, after vulcanization, an integral structure with the outer rubber body.

Referring to the accompanying drawing, 1 designates the cork filling, surrounded by the layers of fabric 3, and inclosed by the rubber body 4. The wheel and rim may be of any suitable construction.

The tire 4 is formed of a body material of rubber, or of a suitable material having the characteristics of rubber, and the wall thickness is greatest on the traveling surface or tread of the tire. In accordance with this invention, the center of the tire is formed by a body of triturated, agglutinated cork, which may be mixed, impregnated or imbibed with rubber, natural or artificial caoutchouc, bichromated gelatin, elastic collodion, casein, or with any other analogous substance which will impregnate the cork and form with the same an integral coherent structure.

This filling material is surrounded by reinforcing layers of a suitable fabric and the outer rubber body applied successively, and the whole may be vulcanized together, or the cork filling and the layers of fabric may be vulcanized separately and the rubber body applied and vulcanized successively. When formed and vulcanized, the cork, the reinforcement and the rubber body will form an integral, coherent structure.

In order to increase the resiliency of the tire and to prevent any deformation of the cork filling through the heavy pressure on the tire, I provide, on each side of the agglutinated cork body, a cushion 2 of rubber or of any other elastic material, the convex face of said cushions being adjacent to the slightly concave sides of the cork body. These cushions extend the whole length of the filling and are inclosed by the reinforcing material, forming an integral structure with the same after vulcanization.

It is obvious that various changes may be made in the details of construction without departing from the spirit of this invention, and it is, therefore, to be understood that this invention is not to be limited to the specific details shown and described.

What I claim is:

1. A tire including a hollow rubber body, a core having concave sides, layers of fabric enveloping such core and rubber cushions interposed between such fabric and the sides of the core.

2. A tire including a hollow rubber body, a core having concave sides, layers of fabric enveloping such core, and rubber cushions having one of their sides convex, such cushions being interposed between the fabric and sides of the core and having their convex sides fitting into the concave sides of the core.

In testimony whereof I affix my signature in presence of two witnesses.

MIGUEL BARRIOS GOMEZ.

Witnesses:
CARLOS CISNEROS,
H. M. BERGEN.